No. 875,988.
PATENTED JAN. 7, 1908.
F. S. FULLER.
PLOW.
APPLICATION FILED FEB. 10, 1905.
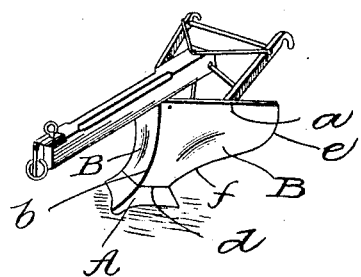
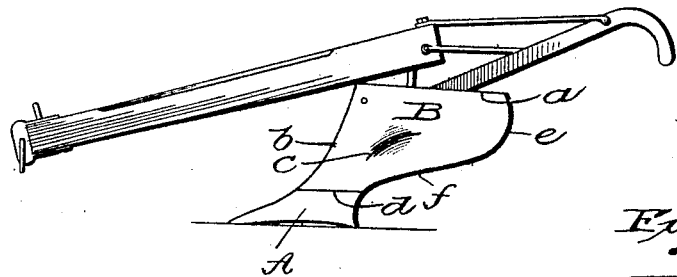
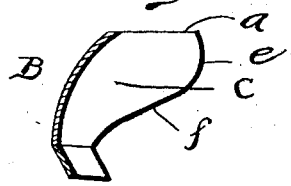
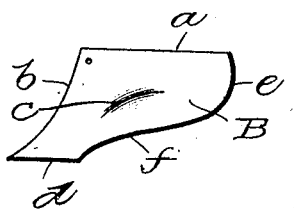
Witnesses
Inventor
Fred S. Fuller,
By William W. Deane
his Attorney

UNITED STATES PATENT OFFICE.

FRED S. FULLER, OF GREELEY, COLORADO.

PLOW.

No. 875,988.  Specification of Letters Patent.  Patented Jan. 7, 1908.

Application filed February 10, 1905. Serial No. 245,038.

*To all whom it may concern:*

Be it known that I, FRED S. FULLER, a citizen of the United States, residing at Greeley, in the county of Weld and State of Colorado, have invented certain new and useful Improvements in Plows, of which the following is a specification.

My invention pertains to plows, more particularly plows for making ditches; and it has for its object to provide a plow embodying mold-boards of such construction that it is highly efficient in cutting ditches and removing weeds and otherwise cleaning ditches already cut, and yet is light of draft, and is adapted to be held to its work and properly manipulated with but a minimum amount of effort on the part of the plowman.

The invention will be fully understood from the following description and claim when taken in connection with the accompanying drawings, forming part of this specification, in which:

Figure 1 is a front, perspective view of the plow constituting the present embodiment of my invention; Fig. 2, a side elevation of the plow; Fig. 3, a detail perspective view of one of the mold-boards, as the same appears when removed; and, Fig. 4 is a detail section taken through one of the mold boards in the plane indicated by the line 4—4 of Fig. 2, looking rearwardly.

Similar letters designate corresponding parts in all of the views of the drawings, referring to which:

A is the shear of my novel plow, which is of the shape best shown in Fig. 1; and B B are the mold-boards which are bolted or otherwise suitably connected together and to the shear. The said mold-boards are relatively arranged so that their upper ends $a$ describe an obtuse angle; and their forward edges $b$, which meet at the prow of the plow, are slightly dished or curved from the shear A to the upper end of the plow, as definitely illustrated in Fig. 2. The mold-boards are also peculiar in that each has a slightly concaved or dished forward side $c$, definitely shown in Fig. 4, a lower end $d$ shorter than its upper end $a$, in about the proportion illustrated, and arranged to abut against the upper edge of the shear A, a rear edge $e$ which is slightly convex or rearwardly curved and, at the same time, is slightly inclined downwardly and inwardly, and an outer edge $f$ which extends between the lower end $d$ and the edge $e$ and is slightly concave or forwardly curved, as clearly shown.

In virtue of the dished prow of the plow as a whole, the concave faces of the mold-boards, and the comparatively narrow portion immediately above the shear A which narrow portion is formed by the inwardly curved rear edges $f$ of the mold-boards, it will be observed that the plow is calculated to easily cut its way through soil and is consequently light on a draft animal or animals; also, that the plow is adapted to be held to its work and properly manipulated by the plowman with but little effort on the part of the latter—this because but a comparatively narrow portion of soil is on the deeper and comparatively narrow part of the plow. It will further be observed that because of the mold-boards being increased in width toward their upper ends, the soil lifted by the lower part of the plow will be turned over on the ground at opposite sides of the ditch, leaving the latter smooth and clean.

In addition to making ditches for irrigating and other purposes, my novel plow may obviously be used to advantage in clearing ditches of weeds and other obstructions.

Having thus described the invention what I claim as new, and desire to secure by Letters Patent, is:—

A ditching plow comprising a shear, and mold-boards fixedly connected together and to the shear; the upper ends $a$ of the mold-boards being straight and horizontal and describing an obtuse angle and their forward edges $b$ meeting at the prow of the plow and being dished or curved from the shear to the upper end of the plow, and each mold-board having a slightly dished or concave forward side $c$, a lower end $d$ shorter than its upper end $a$ and abutting against and corresponding in length to the upper edge of one arm of the shear, a rearwardly-curved rear edge $e$ inclined downward and inward, and an outer edge $f$ extending between the lower end $d$ and the edge $e$ and slightly curved forward.

In testimony whereof I affix my signature in presence of two witnesses.

FRED S. FULLER.

Witnesses:
 C. T. NEILL,
 L. B. CARREL.